United States Patent
Hayden et al.

(10) Patent No.: US 9,103,723 B2
(45) Date of Patent: Aug. 11, 2015

(54) OPTICAL SURVEILLANCE SYSTEMS AND METHODS

(71) Applicant: Applied Energetics Inc., Tucson, AZ (US)

(72) Inventors: Joseph C. Hayden, Tucson, AZ (US); Jiamin (Jim) Zhang, Tucson, AZ (US); Paul B. Lundquist, Vail, AZ (US)

(73) Assignee: APPLIED ENERGETICS, INC., Tucson, AZ (US)

( * ) Notice: Subject to any disclaimer, the term of this patent is extended or adjusted under 35 U.S.C. 154(b) by 63 days.

(21) Appl. No.: 13/692,600

(22) Filed: Dec. 3, 2012

(65) Prior Publication Data

US 2013/0141710 A1 Jun. 6, 2013

Related U.S. Application Data

(60) Provisional application No. 61/565,859, filed on Dec. 1, 2011.

(51) Int. Cl.
*G01C 3/08* (2006.01)
*G01J 1/42* (2006.01)
*G08B 13/183* (2006.01)
*G01V 8/20* (2006.01)

(52) U.S. Cl.
CPC ............... *G01J 1/4257* (2013.01); *G01C 3/08* (2013.01); *G01V 8/20* (2013.01); *G08B 13/183* (2013.01)

(58) Field of Classification Search
CPC ............ G01J 1/42; G01J 1/4257; G01C 3/08
USPC .......... 356/3.01, 3.09, 4.01, 4.07, 5.01, 5.09, 356/9, 625

See application file for complete search history.

(56) References Cited

U.S. PATENT DOCUMENTS

| | | | |
|---|---|---|---|
| 3,898,639 A * | 8/1975 | Muncheryan | 340/529 |
| 2003/0206105 A1* | 11/2003 | Grebenshchikov et al. | 340/556 |
| 2010/0321500 A1* | 12/2010 | Cornett et al. | 348/159 |
| 2011/0043806 A1* | 2/2011 | Guetta et al. | 356/432 |

* cited by examiner

*Primary Examiner* — Isam Alsomiri
*Assistant Examiner* — Samantha K Abraham
(74) *Attorney, Agent, or Firm* — Duft Bornsen & Fettig LLP

(57) ABSTRACT

Systems and methods presented herein provide for optical surveillance using modulated lasers, or other forms of light, and optical detection. In one embodiment, an optical surveillance system includes a light source, such as a laser or light emitting diode, and a signal generator operable to modulate the light source. The system also includes a detector operable to detect the modulated light source and a processor communicatively coupled to the detector to distinguish the modulated light source from other detected light based on the modulating waveform of the modulated light source. The processor is also operable to determine a presence of an object between the laser and the detector based on an obscuration of the laser pulses on the detector.

10 Claims, 12 Drawing Sheets

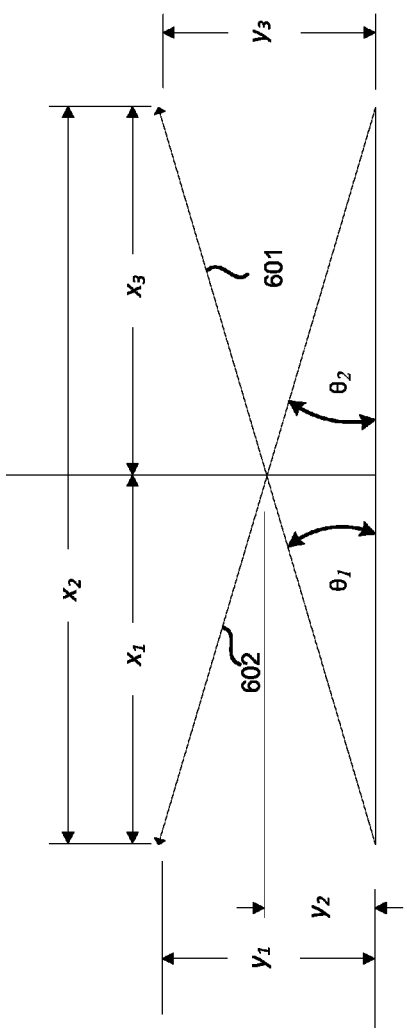

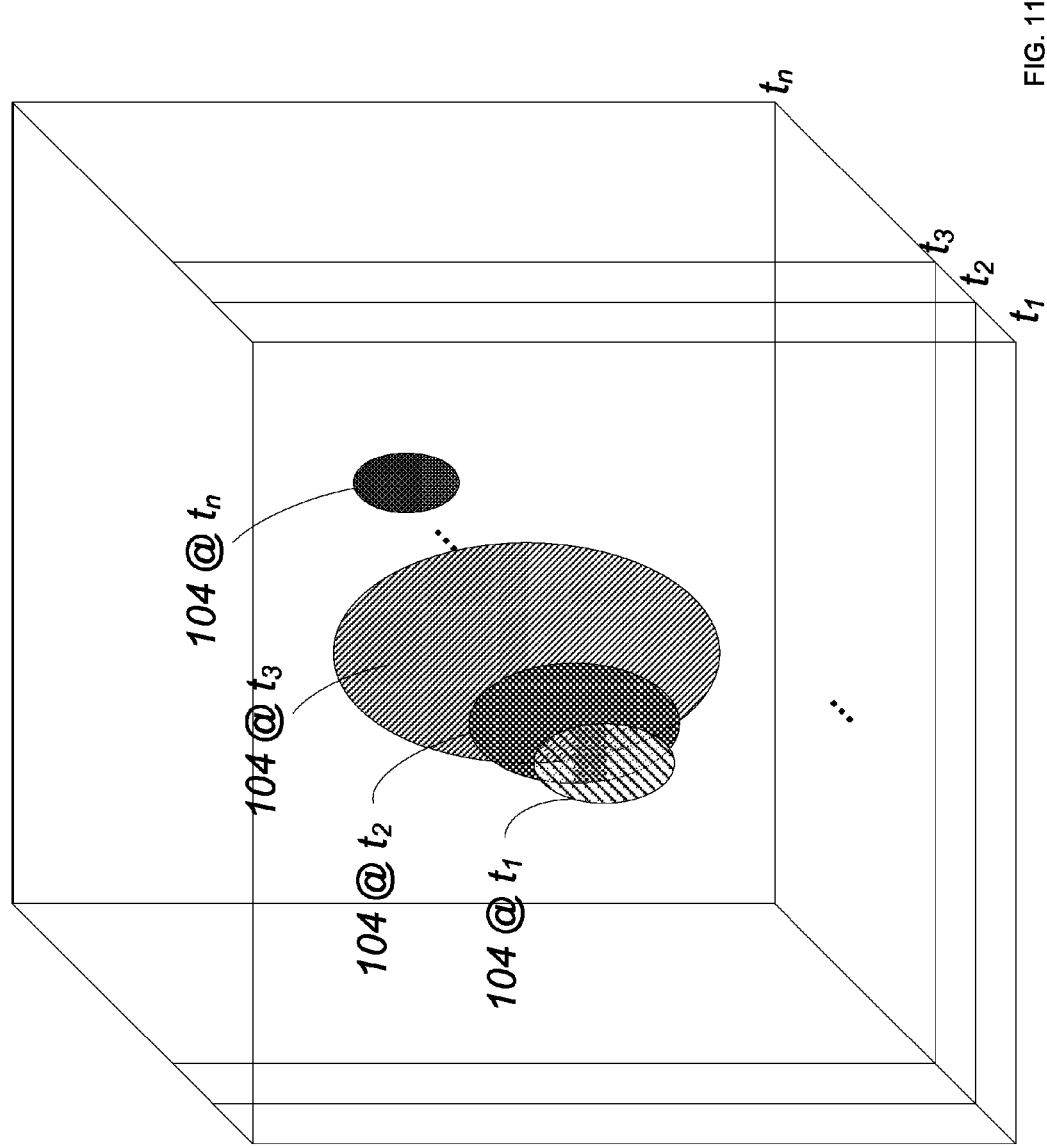

OPTICAL SURVEILLANCE SYSTEMS AND METHODS

CROSS REFERENCE TO RELATED APPLICATIONS

This patent application claims priority to, and thus the benefit of an earlier filing date from, U.S. Provisional Patent Application No. 61/565,859 (filed Dec. 1, 2011 and entitled "Laser Fencing"), the entire contents of which are hereby incorporated by reference.

FIELD OF THE INVENTION

The invention relates generally to various optical means of detection and in more particular embodiments laser fencing that provides optical detection and surveillance.

BACKGROUND

Fences are generally designed to prevent people, animals, etc. from leaving and accessing a particular area. Mechanical fences, such as chain-link and barbed wire, can be scaled if not continuously monitored. Continuous monitoring, however, is not always possible. For example, some fences stretch relatively long lengths of land, such as the case with national border fences. There is simply not enough manpower, nor is it economically feasible, to physically and continuously monitor the entire length of these fences.

Lasers can be used in determining intrusions by detecting a break in a beam. For example, a laser may be in continuous optical communication with a detector. If an intruder crosses the beam, then the detector may trigger an alarm. However, these detection systems do not provide any identification of the intrusion. Rather, they merely indicate that some form of intrusion has taken place. As such, animals or moving objects can trigger false alarms. Moreover, these detection systems do not function well in the outdoors due to the presence of ambient light (e.g., sunlight) so they are generally not able to provide any type of "fencing".

SUMMARY OF THE INVENTION

Systems and methods presented herein provide for optical surveillance using modulated lasers, or other forms of light, and optical detection. In one embodiment, an optical surveillance system includes a light source, such as a laser or light emitting diode, and a signal generator operable to modulate the light source. The system also includes a detector operable to detect the modulated light source and a processor communicatively coupled to the detector to distinguish the modulated light source from other detected light based on the modulating waveform of the modulated light source. The processor is also operable to determine a presence of an object between the laser and the detector based on an obscuration of the laser pulses on the detector.

In another embodiment, a laser fence includes a signal generator operable to generate a modulating waveform and a laser operable to output laser pulses based on the modulating waveform. The laser fence also includes a detector operable to detect the laser pulses and a processor communicatively coupled to the detector to distinguish the laser pulses from other detected light based on the modulating waveform. The processor is further operable to determine a presence of an object between the laser and the detector based on an obscuration of the laser pulses on the detector. The modulating waveform of the laser pulses may also prevent countermeasures from being used as only the owner of the laser fence would know the modulating frequency of the laser. The laser fence may also include an optical element operable to fan the light of the laser pulses to the detector. The laser fence may also include a mount for configuring the laser fence to the hull of a boat to repel piracy.

In another embodiment, a laser fence includes a signal generator operable to generate a plurality of modulating waveforms. The laser fence also includes a plurality of lasers, each laser being communicatively coupled to the signal generator to modulate the laser pulses according to a unique modulating waveform. The laser fence also includes a detector operable to detect the laser pulses from each of the lasers and distinguish origins of the laser pulses based on their respective modulating waveforms. The detector is further operable to determine a presence of the object between the lasers and the detector and distinguish it from various shapes to prevent false detections.

In another embodiment, a laser fence includes a first detection post that includes a laser and a plurality of photo detectors and a second detection post that includes a laser and a plurality of photo detectors. The second detection post is positioned opposite to the first detection post to form a fence plane. The laser fence also includes a processor operable to detect an object in the fence plane. The laser of the first detection post fires laser pulses to the photo detectors of the second laser post at a first pulse repetition frequency and the laser of the second detection post fires laser pulses to the photo detectors of the first laser pulse at a second pulse repetition frequency. The first and second pulse repetition frequencies are different. The processor may determine a location of the object in the fence plane and even determine a size of the object in the fence plane based on the location. The processor may also generate an image of the object based on multiple samples of the object via the laser pulses from the lasers of the first and second detection posts. The laser fence may also include a camera to capture an image or a video of the object in the fence plane. The processor may trigger the camera to capture the image or video of the object in the fence plane upon detection. The processor may also generate an alarm upon detection of the object in the fence plane.

In another embodiment, a laser fence includes a laser operable to fire laser pulses based on a modulated waveform and a plurality of photo detectors operable to detect the laser pulses. The laser also includes a LIDAR receiver operable to determine a distance of an object from the laser to determine a size of the object.

In another embodiment, an optical fence includes an array of light emitting diodes and a detector operable to detect an obscuration between the detector and the light emitting diodes to determine an intrusion of an object between the detector and the light emitting diodes. Each of the light emitting diodes maybe operable to emit light at a unique wavelength, a unique pulse repetition frequency, or a combination thereof.

BRIEF DESCRIPTION OF THE DRAWINGS

Some embodiments of the present invention are now described by way of example and with reference to the accompanying drawings. The same reference number represents the same element or the same type of element on all drawings.

FIGS. 6A and 6B illustrate a detection algorithm for a laser fence in one exemplary embodiment.

FIG. 11 illustrates an algorithmic approach to forming an image of an object.

DETAILED DESCRIPTION OF THE DRAWINGS

The figures and the following description illustrate specific exemplary embodiments of the invention. Various arrangements that, although not explicitly described or shown herein, may be devised to embody the principles of the invention and are, therefore, included within the scope of the invention. Furthermore, any examples described herein are intended to aid in understanding the principles of the invention and are to be construed as being without limitation to such specifically recited examples and conditions. As a result, the invention is not to be limited to the specific embodiments or examples described below.

Figure 1:
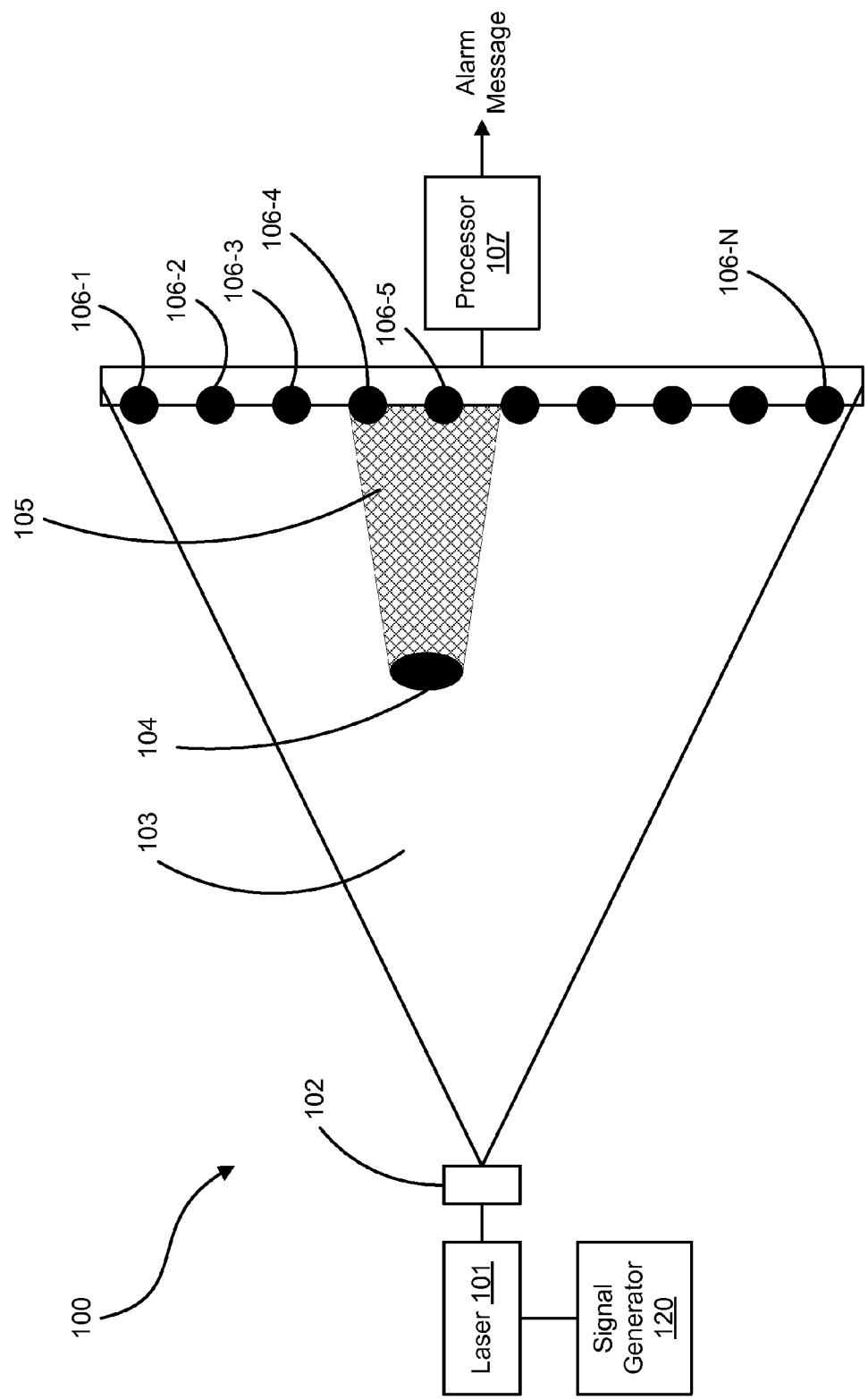
FIG. 1 is a block diagram of a laser fence in one exemplary embodiment.

FIG. 1 is a block diagram of a laser fence 100 in one exemplary embodiment. The laser fence 100 includes a laser 101 that is operable to fire laser pulses. The laser 101 may be configured to fire the laser pulses at a particular frequency such that the optical energy 103 from the laser pulses may be discriminated from other forms of light. For example, the laser 101 may be modulated to fire the laser pulses according to a modulating waveform. A signal generator 120 may be configured with or coupled to the laser 101 to provide the modulating waveform. The modulated laser pulses may be used to enhance detection of the optical energy 103 from the laser pulses through filtering. That is, the optical energy 103 from the laser pulses may be filtered out from ambient light based on the frequency of the modulated waveform. Such filtering may also be useful in preventing optical countermeasures. For example, since the frequency of the laser pulses is known only to the "owner" of the laser fence 100, others may be precluded from blocking detection.

The laser 101 may include or be configured with an optical element 102 that is operable to "fan" the optical energy 103 of the laser pulses so as to provide a wide swath of optical energy for detection. As such, the laser fence 101 may include a plurality of detectors 106-1-N (where N is simply intended as an integer greater than 1 and not necessarily equal to any other N reference numbers disclosed herein) that are operable to detect the optical energy 103 so as to determine the presence of a mobile object 104 (e.g., a person, a vehicle, a rope, a scaffolding means, an animal, etc.) and thereby provide a detection fence. For example, when the object 104 crosses the plane between the laser 101 and the detectors 106 (in this example a vertical plane), the object 104 casts a shadow, or otherwise obscures the detectors 106-4 and 106-5, thereby blocking detection of the optical energy 103 from the laser pulses. The processor 107 is communicatively coupled to the detectors 106-1-N so as to identify the object 104 and generate an alarm message if necessary. The laser fence 100 and the detection processing will now be discussed with reference to the flowchart 200 of FIG. 2.

Figure 2:
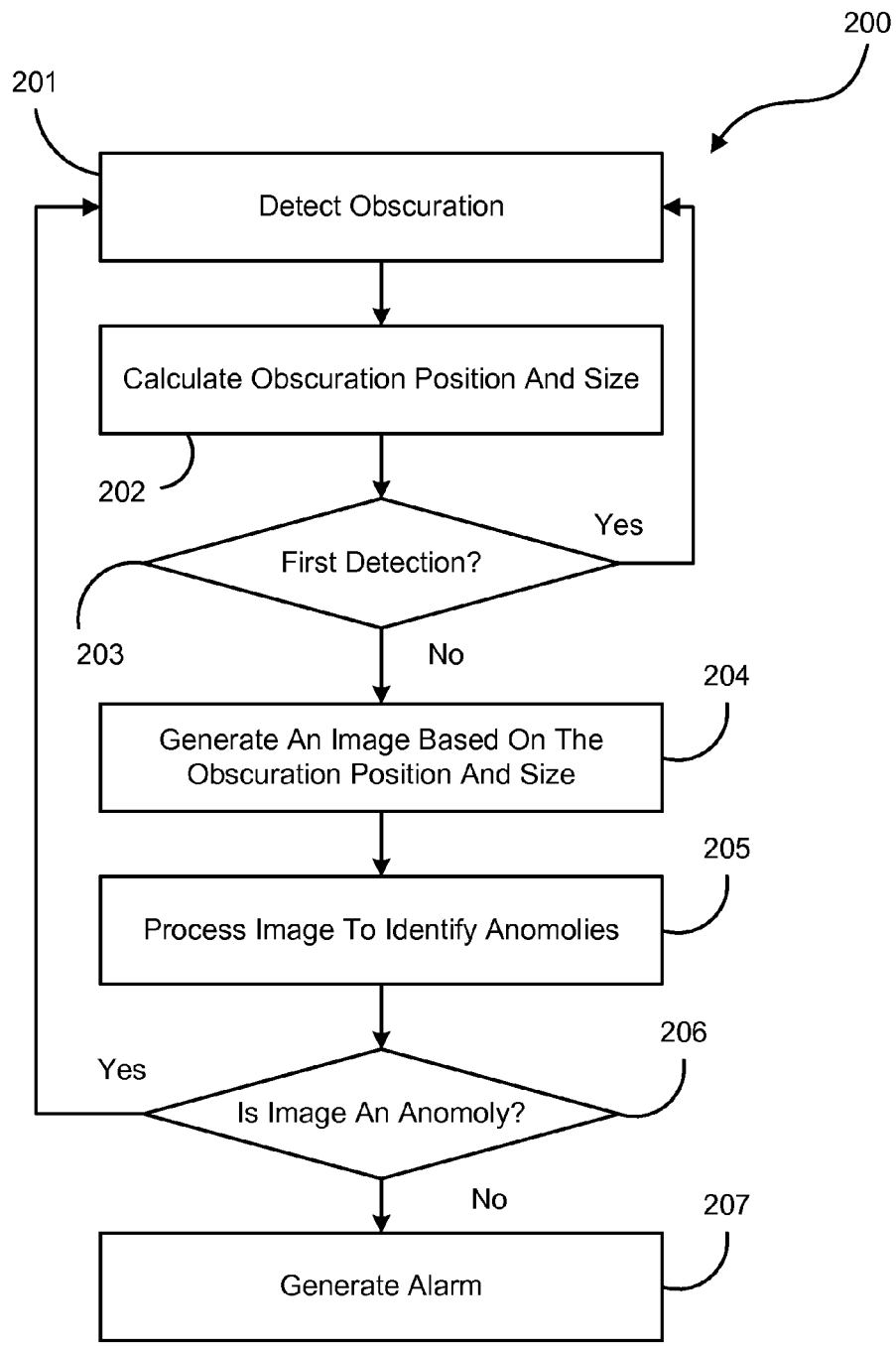
FIG. 2 is a flowchart illustrating an exemplary process employed by the laser fence.

FIG. 2 is a flowchart illustrating an exemplary process 200 employed by the laser fence 100. The process 200 initiates when one or more of the detectors 106-1-N detects an obscuration in the process element 201. Upon detection, the processor 107 initiates calculation of the size and position of the obscuration, in the process element 202. For example, if a distance between the object 104 and the detectors 106 can be determined, the size of the object 104 can be determined based on the obscuration of the detectors 106-4 and 106-5 since that distance is known. That is, the overall length of potential detection in the plane is determined by number of detectors 106-1-N in the plane and their individual spacings. Thus, when the object 104 obscures detection by the detectors 106-4 and 106-5, a total length of obscuration can be computed by the individual spacings of those detectors, at least roughly. Based on trigonometric calculations of the obscuration cast on the detectors 106-4 and 106-5 using the distance of the object 104 from the detectors 106, the size of the object can be roughly determined.

After determining an approximate size and position of the obscuration in the plane between the laser 101 and the detectors 106-1-N, the processor 107 may determine whether this is a first detection, in the process element 203, so as to rule out or discriminate particular intrusions. For example, in a border fencing example, the detection of birds flying through the laser fence 100 generally does not warrant a response of border patrol agents. Accordingly, these types of object intrusions should be removed so that they do not generate an alarm message. However, larger intrusions, such as trucks and people, may require a border patrol's response. The processor 107 is operable to provide such detection capabilities by analyzing the size of the object 104 over time. That is, each laser pulse essentially samples the object 104 such that a discrete three-dimensional image can be ascertained, at least rudimentarily. Based on the size and/or shape of the object 104, the processor 107 can make a determination as to whether any type of response may be needed via the alarm message. Thus, if the processor 107 determines that the detection of the object 104 is a first detection, the processor 107 may detect the obscuration of one or more of the detectors 106-1-N on the next laser pulse before generating an alarm message so as to provide more size and shape analysis of the object 104. After some number of samples, the processor 107 may generate an image of the object 104, in the process element 204, and process the image to identify anomalies (i.e., objects that do not warrant response), in the process element 205. If the image is an anomaly, the processor 107 in the process element 206 continues detecting obscurations in the plane between the laser 101 and the detectors 106-1-N. Otherwise, the processor 107 generates an alarm in the process 207 such that an appropriate response may be taken.

Although shown and described with respect to one laser being fanned to a plurality of photo detectors, the invention is not intended to be so limited. Other embodiments including those without lasers are illustrated below. Additionally, detection features regarding size and distance of the object 104 between a laser and their detectors are shown and described in greater detail below.

Figure 3:
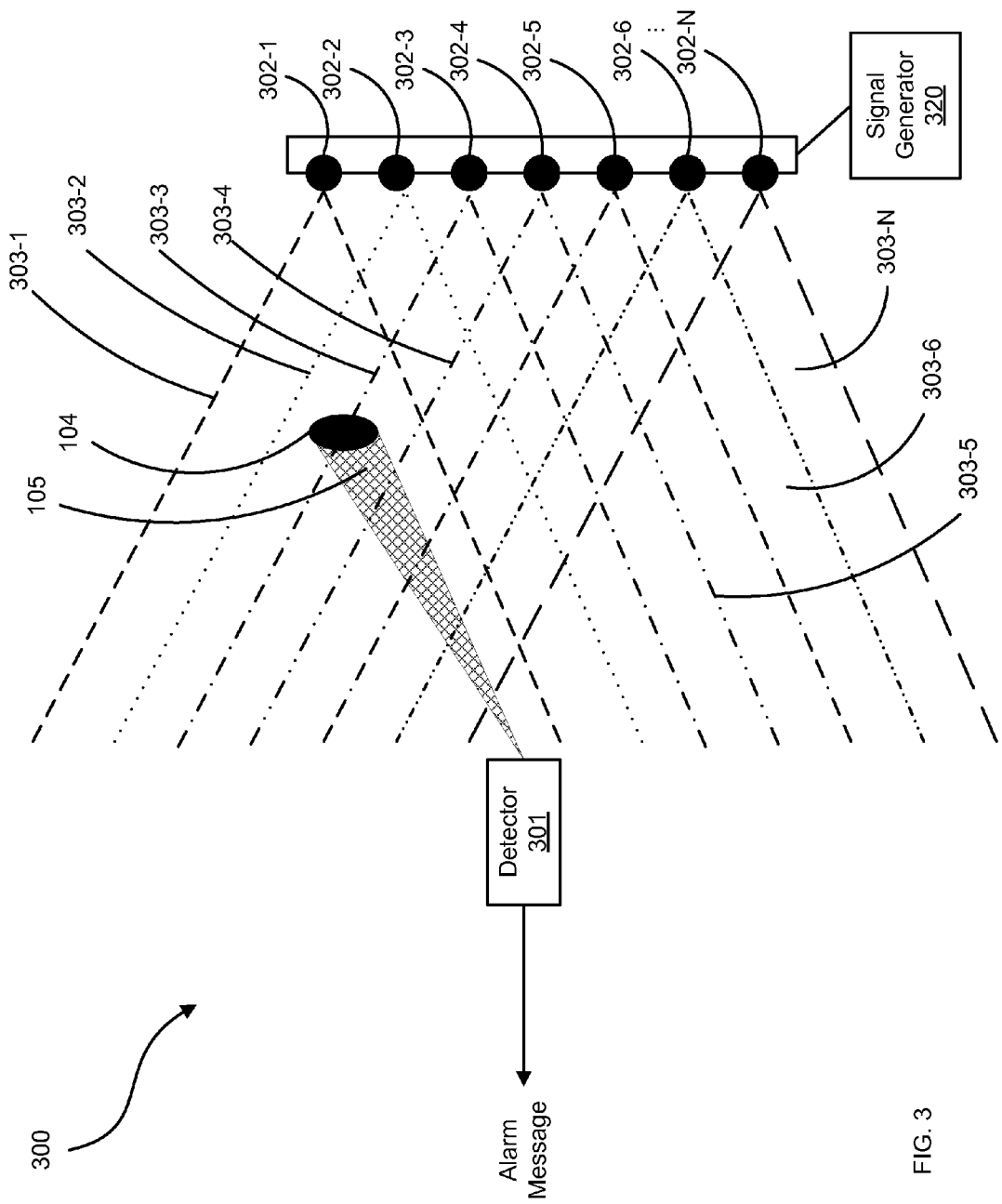
FIG. 3 is a block diagram of another exemplary laser fence embodiment.

FIG. 3 is a block diagram of a laser fence 300 in one exemplary embodiment. In this embodiment, a plurality of lasers 302-1-N are configured to fire laser pulses for detection by a photo detector 301. Each laser 302 may be configured to fire laser pulses at a unique frequency as indicated by their associated "fans" of optical energy 303-1-N (e.g., the differing dotted lines emanating from each laser 302). In this regard, a signal generator 320 may provide modulating waveforms to the lasers 302 that differ from one another such that a detector 301 may detect each fan of optical energy 303-1-N and distinguish its origin based on its frequency. Accordingly, when an object 104 is present in the plane between the lasers 302-1-N and the detector 301, the object 104 casts an obscuration 105, or shadow, which is detected according to frequency. In this example, the object 104 casts an obscuration 105 in some of the fans of optical energy 303 from the laser pulses of respective lasers 302 such that the detector 301 is able to determine which lasers 302 are being obscured and computes the size of the object 104 based on those frequencies. If the size of the object 104 does not warrant response, the detector may simply continue detecting as described above. Otherwise, the detector 301 may generate an alarm message. Although shown and described with respect to the detector 301 being a single element, the detector 301 may be configured as a plurality of photodiodes such that each photodiode is operable to detect an individual laser and generate a corresponding electronic signal based thereon. An example of such is shown and described below in FIG. 4.

Figure 4:
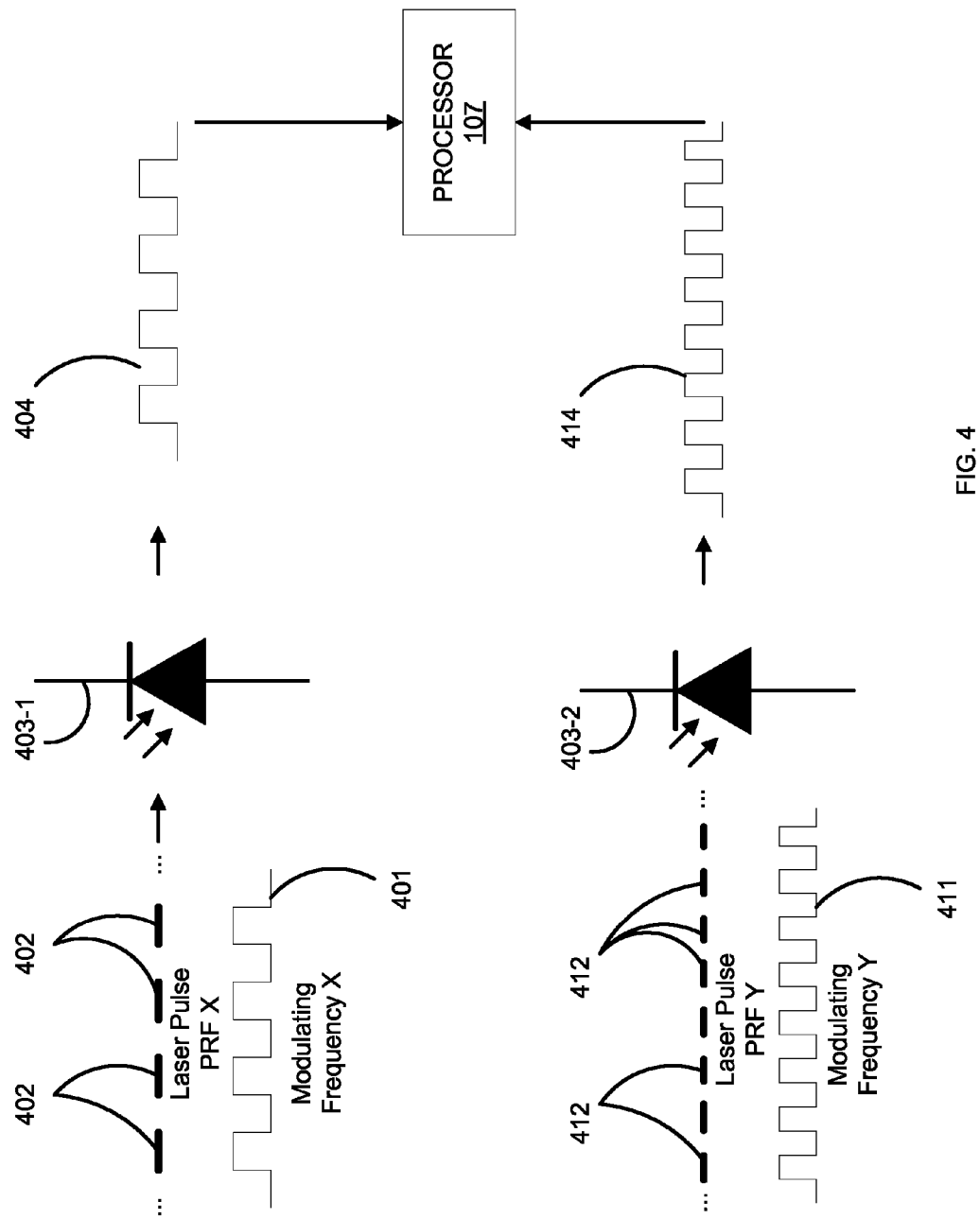
FIG. 4 illustrates signal diagrams of a laser fence in one exemplary embodiment.

FIG. 4 illustrates signal diagrams of a laser fence, in one exemplary embodiment such that individual photodiodes can be used to distinguish corresponding lasers from other lasers. To illustrate, a first laser is modulated according to a first modulating frequency X based on the signal 401. The laser pulses 402 fire at a pulse repetition frequency (PRF) based on the modulating frequency X. The photodiode 403-1 detects the train of laser pulses 402 and generates a corresponding electronic signal 404 that may be processed by the processor 107. Similarly, a second laser is modulated according to a second modulating frequency Y based on the signal 411 so as to fire laser pulses 412 at a corresponding PRF that differs from the first laser. The photodiode 403-2 detects these laser pulses and generates a corresponding electronic signal 414 for processing by the processor 107. Because of the two unique frequencies, the processor 107 can identify which lasers are being detected. And, if a particular one or more lasers are being obscured by the object 104, the processor 107 may determine a size of the object based on the number of lasers being obscured and their spacings in the plane (e.g., due to the overall length of the obscuration).

Figure 5:
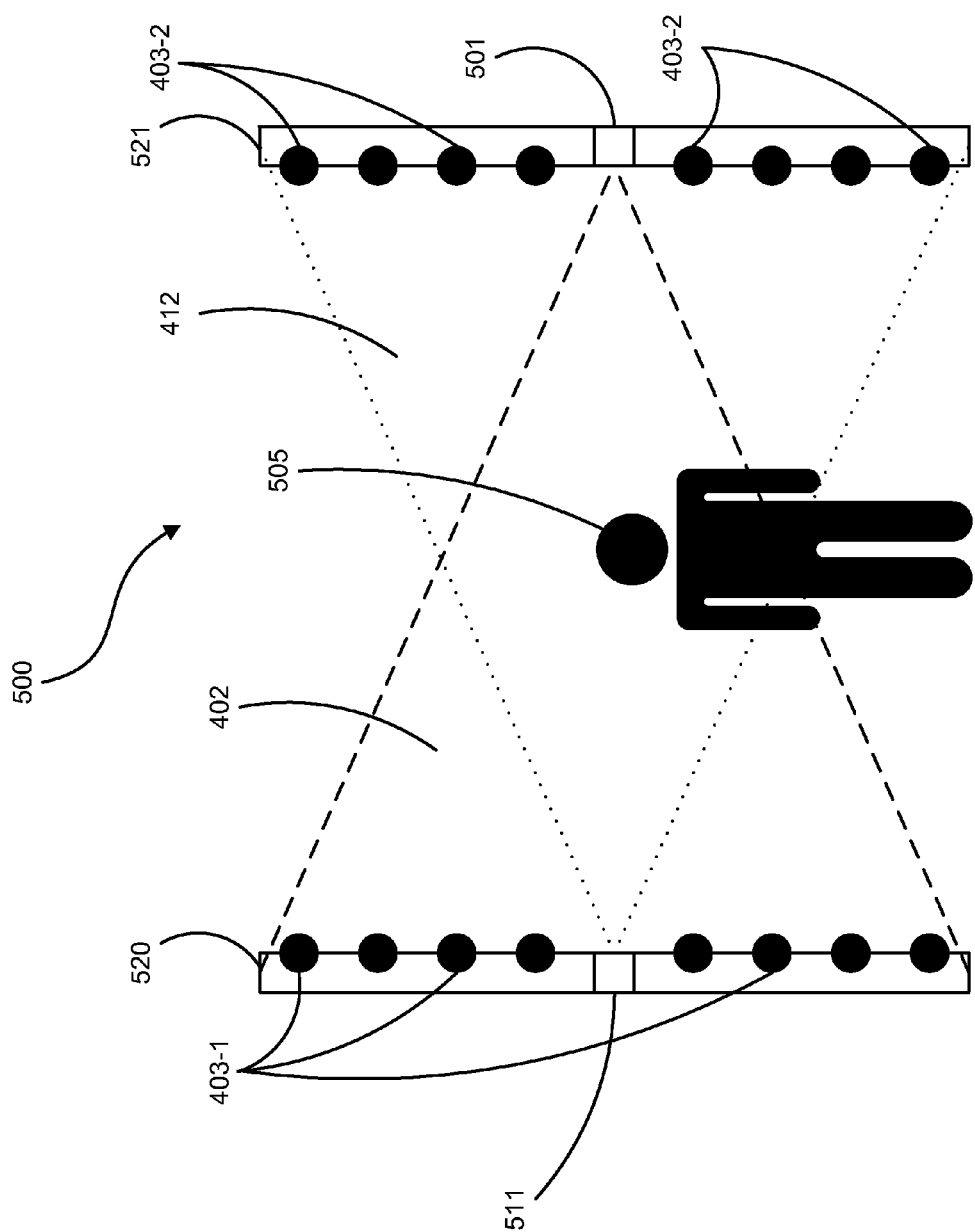
FIG. 5 is a block diagram of another exemplary laser fence embodiment employing the signaling techniques illustrated in FIG. 4.

FIG. 5 is a block diagram of another exemplary laser fence 500 employing the signaling techniques illustrated in FIG. 4. In this embodiment, the laser fence 500 is configured with first and second lasers 501 and 511 opposing each other in a relatively vertical plane. The first laser 501 is operable to fire the laser pulses 402 in a fan of optical energy towards the opposing detectors 403-1 configured on the detection post 520. The second laser 511 is operable to fire the laser pulses 412 in a fan of optical energy towards the opposing detectors 403-2 configured on the detection post 521. In this example, a person 505 passes through the fans of optical energy provided by the laser pulses 402 and 412, thereby obscuring one or more of the detectors 403-1 and 403-2 in the vertical plane. Based on a number of the detectors 403-1 and 403-2 being obscured and their spacings in the vertical plane, a size of the intrusion and a distance from each of the lasers 511 and 501 can be determined. Accordingly, if the processor 107 (not shown in this embodiment for the sake of simplicity) determines that the intrusion is indeed a person 505 or another object 104 worthy of response, the processor 107 generates an alarm message to alert the appropriate response. As mentioned, since the lasers 501 and 511 are operating at different PRFs, the processor 107 can distinguish the lasers from each other and from ambient light. The processor 107 can also determine the size and distance of the person 505 intruding. An example of such detection processing is shown and described below in FIGS. 6A and 6B.

Figure 6A:
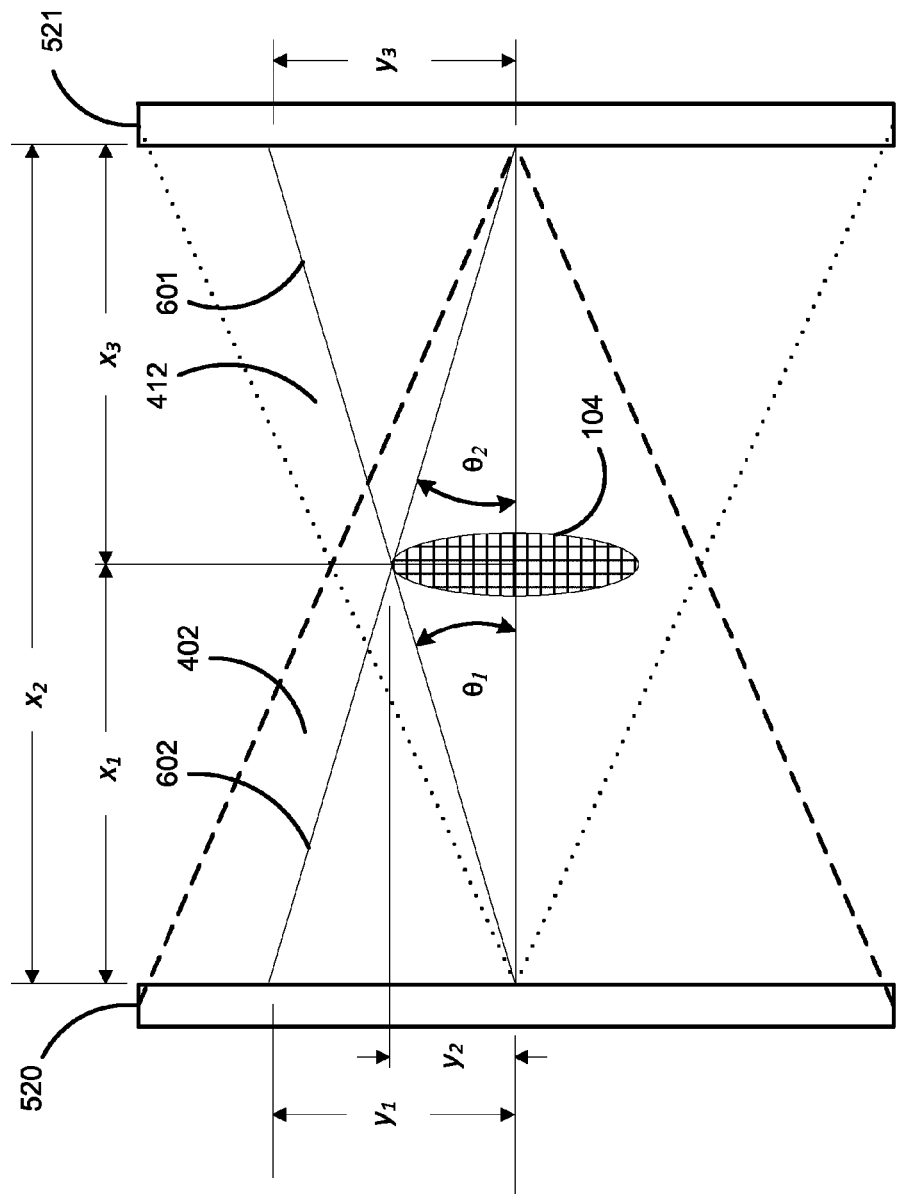

FIGS. 6A and 6B illustrate a detection algorithm for a laser fence in one exemplary embodiment. In FIG. 6A, the detection algorithm for the laser fence 500 is illustrated (although the concepts can apply to other embodiments herein) as determining the height of an object 104 based on the shadow it casts from one laser to an opposing detection post 521 as if the laser was pointed directly at midpoint of the object 104's height, and vice versa with detection post 520. A detection pattern of height $2(y_1)$ is detected at the left detection post 520, and a detection pattern of height $2(y_3)$ is detected at a right detection post 541. The right detection post 521 is located a distance $x_2$ away from the left detection post 520. The actual height of the object 104 being detected is $2(y_2)$, the object 104 is a distance of $x_1$ from the left detection post 520 and a distance of $x_3$ from the right detection post 521. Using trigonometric and algebraic relationships, the actual height of the detected object (as well as its distance from each of the detection posts 520 and 521) may be determined from the size of the detection patterns at the left and right detection posts 520 and 521.

FIG. 6B illustrates a simplified view of the upper halves of the detection patterns at the left detection post 520 and the right detection post 521. With $y_1$, $y_3$, and $x_2$ known, the desired values may be calculated to determine the height of the object (i.e., $2(y_2)$ in this example) as well as the object's distance to each detection post (i.e., $x_1$ and $x_3$). Line 601, defining the uppermost bound of the detection pattern found at the right detection post 521, may be modeled as a linear function extending upward (e.g., from a laser transmitter of the left detection post 520) towards the right detection post 521. Thus, line 601 may be defined by the following equation:

$$f_1(x) = \frac{y_3}{x_2}x,$$

where x increases from left to right and where x is zero at the left detection post 520. Line 602 may also be modeled as a linear function, extending upward from the right detection post 521 towards the left detection post 520. Because line 602 starts at the same vertical position as line 601 (i.e., the transmitter for the left detection post 520 is at substantially the same vertical position as the transmitter for the right detection post 521), line 602 may be defined by the equation:

$$f_2(x) = \frac{y_1}{x_2}x,$$

where x increases from right to left and where x is zero at the right detection post 521. At the location of the object 104 detected by the detection posts 520 and 521, both of the linear functions should yield the same result of $y_2$. Thus, $$f_1(x_1) = f_2(x_3).$$

This yields the result that:

$$\frac{y_3}{x_2}x_1 = \frac{y_1}{x_2}x_3$$

With the understanding that $x_1=x_2-x_3$, the above equation may be substituted with the following:

$$\frac{y_3}{x_2}(x_2 - x_3) = \frac{y_1}{x_2}x_3$$

Solving for $x_3$ yields:

$$x_3 = \frac{y_3 x_2}{(y_1 + y_3)}$$

This means that, for $x_1$, $$x_1 = x_2 - \frac{y_3 x_2}{(y_1 + y_3)}$$

With both $x_1$ and $x_3$ having been solved for, the distance of the object 104 to each of the detection posts 520 and 521 is known. This leaves only the height of the object (i.e., $2(y_2)$) to be determined. With the understanding that the ratio of $y_1$ to $y_2$ is equal to the ratio of $x_2$ to $x_3$, $y_2$ may be determined by the following equation:

$$\frac{y_1}{y_2} = \frac{x_2}{x_3}$$

Substituting for $x_3$ yields:

$$\frac{y_1}{y_2} = \frac{(y_1 + y_3)x_2}{y_3 x_2}$$

Solving for $y_2$ then yields:

$$y_2 = \frac{y_1 y_3}{y_1 + y_3}$$

This means that the actual height of the detected object 104 may be determined as twice the above result for $y_2$. While this model for detection assumes that the two detection posts 520 and 521 are parallel, it may be a relatively simple process to account for skew between the two posts 520 and 521 by adjusting the above formulae to account for the altered trigonometric and algebraic relationships.

Figure 7:
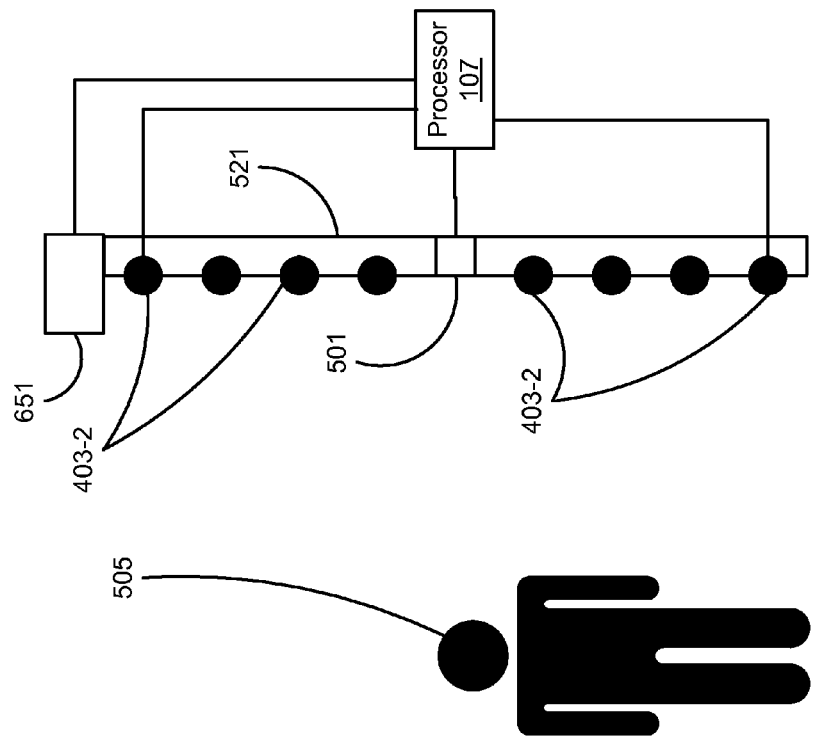
FIG. 7 is a block diagram of another exemplary laser fence embodiment employing cameras.
Figure 7:
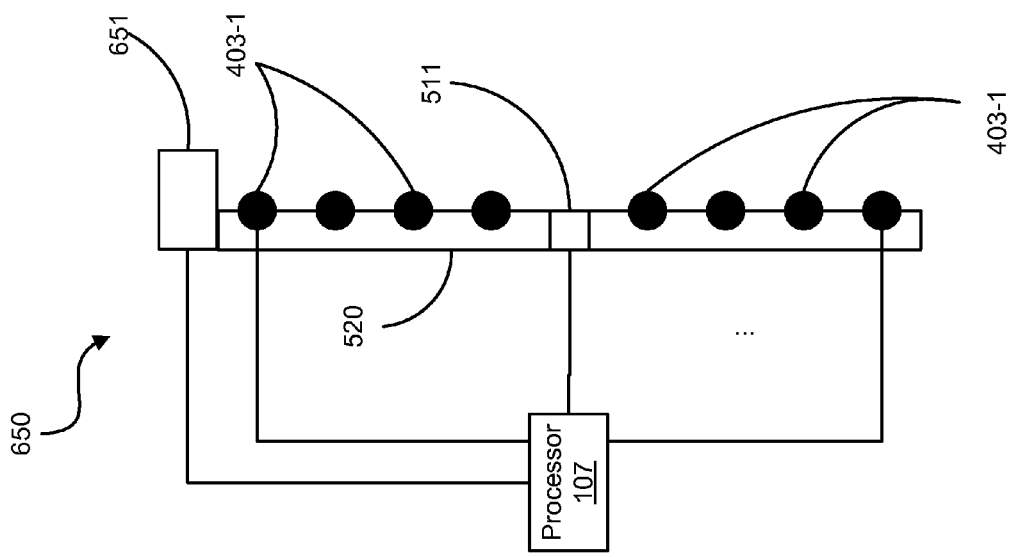

FIG. 7 is a block diagram of another exemplary laser fence 650 employing cameras 651. In this embodiment, cameras 651 are mounted to the left and right detection posts 520 and 521, respectively, and are triggered to capture an image of the person 505 breaching the laser fence 650. For example, if the processor 107 determines that a size and a general shape of the object passing through the laser fence 650 matches that of a person, the processor 107 may direct the cameras 651 to capture an image of that person in addition to generating an alarm message. Continuous video may be may be employed as well. Other forms of optical energy may also be employed for the purposes of fencing.

Figure 8:
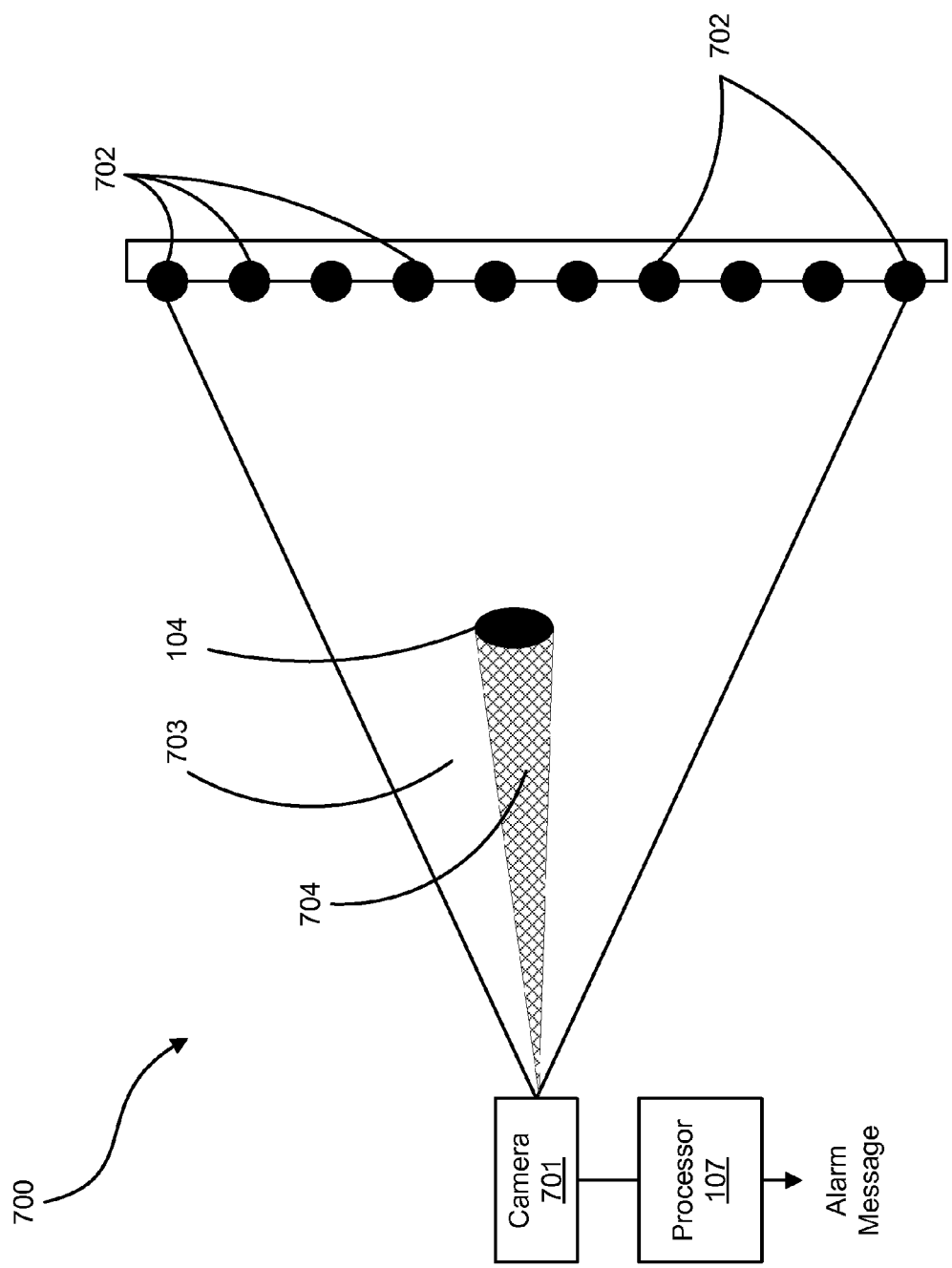
FIG. 8 is a block diagram of an optical fence using a camera and light emitting diodes (LEDs).

FIG. 8 is a block diagram of an optical fence 700 using a camera and light emitting diodes (LEDs). In this embodiment, the light emitting diodes 702 configured upon a detection post and are operable to emit optical energy 703 in the direction of the camera 701, or other optical energy detection means. The camera 701 may be configured to identify the particular wavelength of light being emitted from the LEDs and/or any modulated frequency of the light being pulse from the LEDs. Based on the forgoing, an object 104 breaching the plane between the camera 701 and the LEDs 702 may cast a shadow or otherwise obscure a portion of the optical energy 703 from the LEDs 702. The processor 107 may in turn determine a general size and/or shape of the object 104 and generate an alarm message if necessary.

Figure 9:
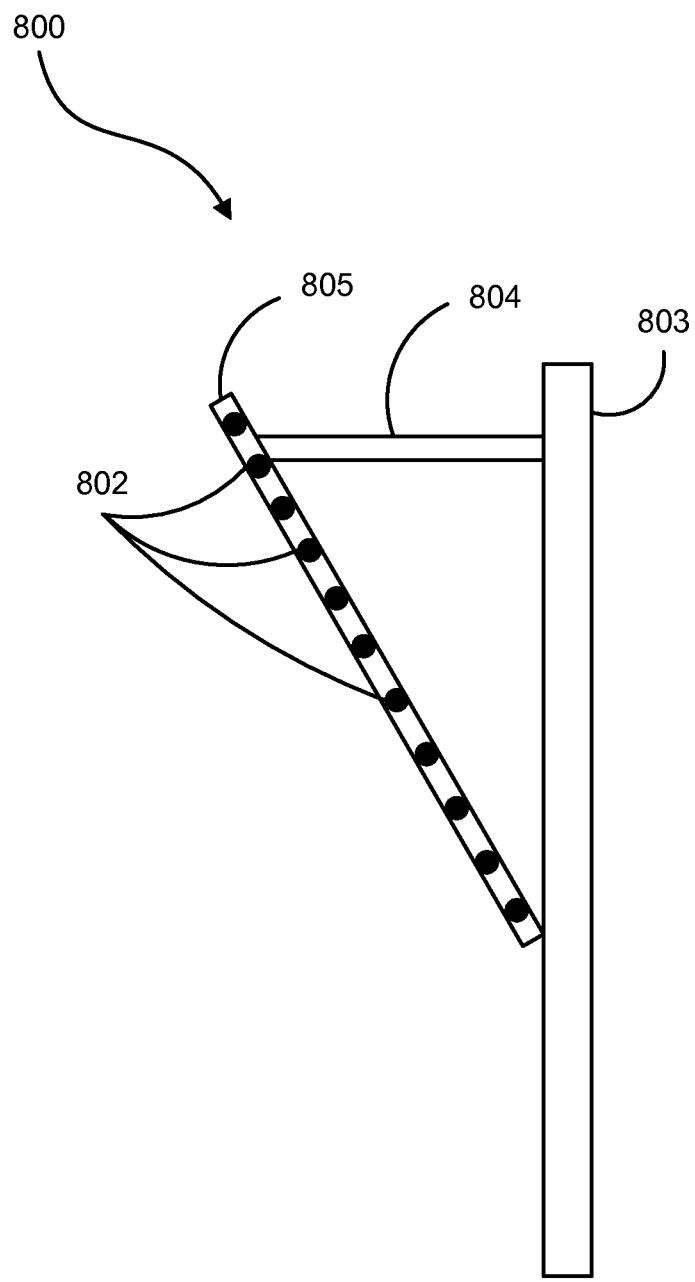
FIG. 9 is a block diagram of a laser fence mounted to a wall or a hull of a ship to detect scaling.

FIG. 9 is a block diagram of a laser fence 800 mounted to a wall 803 or a hull of a ship to detect scaling. For example, piracy has become an ever increasing problem in certain navigable waterways. Part of the reason for this is due to the fact that the hull of a ship cannot be continually and/or completely monitored. This creates opportunities for pirates to board vessels (e.g., by throwing a line or grapple over the hull of the ship). The laser fence 800 is operable to detect any lines and/or any people crossing through the plane of the laser fence 800 such that an alarm may be generated for the appropriate response.

To implement the laser fence 800, the wall 803 may have a bracket 804 attached to a detection post 805 that is used to angle the detection post away from the top of the wall 803. The detection post 805, as with other embodiments described above, may be configured with a plurality of light sources 802. Another detection post (not shown) may have one or more detectors that are operable to distinguish the various light sources 802. Thus, when an object breaches the fence plan established by the light sources 802 and the detectors, a processor may be able to distinguish the object and determine its potential for threat, as similarly described above. As with the embodiments above, the laser fence 800 is also operable to substantially preclude unintended alarms for objects passing through the laser fence 800 (e.g., birds passing through, etc.).

Figure 10:
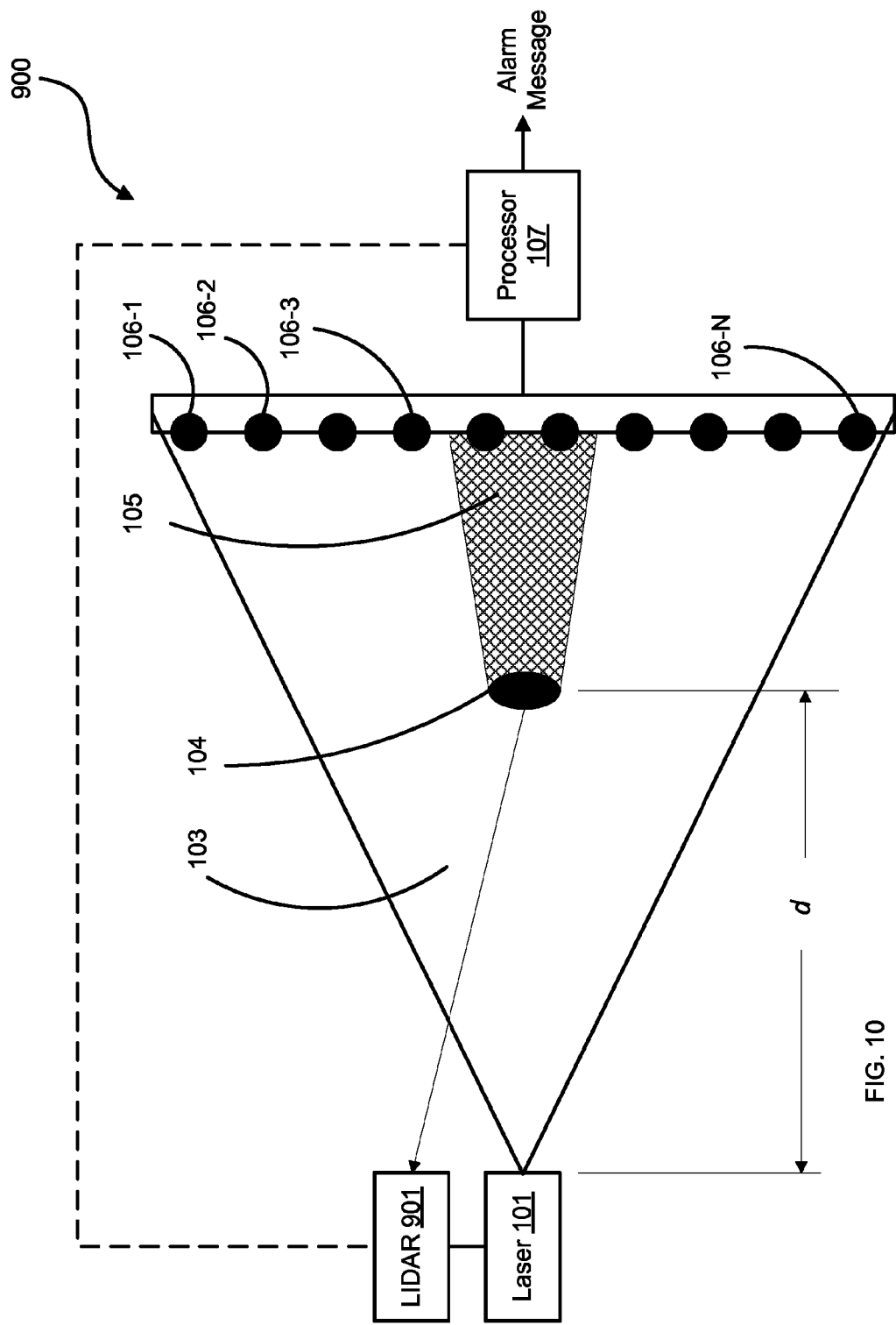
FIG. 10 is a block diagram of another exemplary laser fence embodiment employing a LIDAR receiver to determine a distance between a laser and photo detectors.

FIG. 10 is a block diagram of another exemplary laser fence 900 employing a laser direction ranging (LIDAR) receiver 901 to determine a distance between a laser 101 and a plurality of photo detectors 106-1-N. In this embodiment, the laser 101 is operable to fire laser pulses at a particular frequency and fan the optical energy 103 thereof to the photo detectors 106-1-N for detection, location determination, and sizing of the object 104. As with the embodiments above, the object 104, when it breaches the plane between the photo detectors 106-1-N and the laser 101, obscures one or more of the photo detectors 106. Since a single array of photo detectors 106-1-N is operable in this embodiment, distance of the object 104 from the laser 101 may be difficult to obtain. The LIDAR receiver 901 is operable to detect a reflection and/or a plasma discharge from the laser pulses impinging the object 104. Based on a time of flight between the firing of the laser pulse and its subsequent detection by the LIDAR receiver 901, the distance d between the object 104 and the laser 101 can be determined. Using similar trigonometric expressions described in FIGS. 6A and 6B, the general size of the object 104 can also be determined such that the processor 107 may generate an alarm message when deemed appropriate.

FIG. 11 illustrates an algorithmic approach to forming an image of the object 104. As discussed above, the laser(s) may be operable to fire a plurality of pulses at a particular frequency, or PRF. As each pulse may be used to sample the object 104 and determine a size of the object 104 when the object breaches the laser fence, an image of the object 104 can be obtained. For example, when the object 104 begins passing through the laser fence at the time $t_1$, a first size of the object may be determined. As the object 104 continues passing through the laser fence at times $t_2$–$t_n$, the dimension calculations of the object 104 vary according to the shape of the object 104. Thus, each pulse sampling provides a dimensional "slice" of the object 104 which can in turn be used to discriminate from other objects. The processor 107 may include a database of images of objects not worthy of alarm (e.g., birds breaching a perimeter, etc.). Once the processor 107 collects all the samples of the object 104 and generates an image thereof, the processor 107 may compare that image to the images of the database to determine whether an alarm is necessary.

Although shown and described with respect to various types of objects passing through the laser fence embodiments above, the invention is not intended to be limited to any particular type of detection or alarm generated. For example, the laser/optical fences described herein may be used for other types of detection and alarm such as simply monitoring the types of objects passing through a particular corridor. Additionally, while the invention has been illustrated and described in detail in the drawings and foregoing description, such illustration and description is to be considered as exemplary and not restrictive in character. Certain embodiments described hereinabove may be combinable with other described embodiments and/or arranged in other ways. Accordingly, it should be understood that only the preferred embodiment and variants thereof have been shown and described and that all changes and modifications that come within the spirit of the invention are desired to be protected.

What is claimed is:

1. An optical surveillance system, comprising:
   a plurality of light sources;
   a signal generator operable to continuously modulate each of the light sources with a unique modulating waveform;
   a detector operable to detect the modulated light sources; and
   a processor communicatively coupled to the detector and configured with information of relative distances between the plurality of light sources and with information of the unique modulating waveform for each of the light sources;
   the processor operable to determine a location of an object disposed between the light sources and the detector based on the information of the unique modulating waveform for one or more light sources obscured with respect to the detector and the information of relative distances between the plurality of light sources;
   the processor further operable to determine a size and a shape of the object based on the determined location, the information of the unique modulating waveform for one or more light sources obscured with respect to the detector, and the information of the relative distances between the plurality of light sources.

2. The optical surveillance system of claim 1, wherein:
   the light sources comprise lasers operable to fire laser pulses; and
   the signal generator is operable to modulate the pulse repetition frequency of the laser pulses.

3. The optical surveillance system of claim 1, further including:
   an optical element operable to fan the light sources.

4. The optical surveillance system of claim 1, wherein:
   the processor is further operable to generate an alarm upon detection of the object in a fence plane established between the light sources and the detector.

5. The optical surveillance system of claim 1, wherein:
   the light sources comprise lasers; and
   the system further comprises a LIDAR receiver operable to determine a distance of the object from the lasers.

6. The optical surveillance system of claim 1, wherein:
   the light sources comprise an array of light emitting diodes; and
   a detector is operable to detect an obscuration between the detector and the light emitting diodes by the object to determine an intrusion of the object between the detector and the light emitting diodes.

7. The optical surveillance system of claim 1, wherein:
   the light sources comprise lasers; and
   the detector comprises a plurality of photodiodes, wherein each photodiode is operable to detect an individual laser and to generate a corresponding electronic signal based on the unique modulating waveform of the individual laser.

8. The optical surveillance system of claim 1, wherein:
   a first portion of the plurality of light sources are attached to a first post in a vertical fashion;
   a second portion of the plurality of light sources are attached to a second post in a vertical fashion;
   the detector is operable to detect an obscuration of the modulated light sources on the first post and the second post; and
   the processor is configured to determine a height of the object disposed between the first post and the second post based on the obscuration of the modulated light sources on the first post and the second post as a result of the object being disposed between the first post and the second post.

9. The optical surveillance system of claim 1, wherein:
   the processor includes a database of images; and
   the processor is further operable to compare the determined size and the determined shape of the object to the database of images, and to determine whether to trigger an alarm based on the comparison.

10. The optical surveillance system of claim 1, wherein:
    the processor is further operable to generate a three-dimensional profile of the object based on a series of determined locations of the object and a series of determined sizes and shapes of the object as the object moves in a fence plane established between the light source and the detector; and
    the processor is further operable to process the three-dimensional profile of the object to determine whether to trigger an alarm based on the comparison.

* * * * *